(12) United States Patent
Lee et al.

(10) Patent No.: US 11,479,294 B2
(45) Date of Patent: Oct. 25, 2022

(54) STEERING SYSTEM OF VEHICLE

(71) Applicants: Hyundai Motor Company, Seoul (KR); Kia Motors Corporation, Seoul (KR)

(72) Inventors: Ji Hoon Lee, Gangwon-do (KR); Jin Gyo Suh, Seoul (KR); Sung Han Cho, Gyeonggi-do (KR); Seo An Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 794 days.

(21) Appl. No.: 16/448,400

(22) Filed: Jun. 21, 2019

(65) Prior Publication Data
US 2020/0180686 A1 Jun. 11, 2020

(30) Foreign Application Priority Data
Dec. 7, 2018 (KR) .................. 10-2018-0156811

(51) Int. Cl.
*B62D 5/18* (2006.01)
*G01L 5/22* (2006.01)
(Continued)

(52) U.S. Cl.
CPC ............ *B62D 5/18* (2013.01); *B62D 5/08* (2013.01); *B62D 55/1083* (2013.01); *F16F 9/537* (2013.01); *G01L 5/221* (2013.01)

(58) Field of Classification Search
CPC ........ B62D 5/18; B62D 5/08; B62D 55/1083; B62D 5/0835; B62D 3/10; B62D 5/065; B62D 5/09; B62D 5/10; B62D 5/24; B62D 6/007; B62D 6/02; B62D 6/10; F16F 9/537; F16F 2224/045; F16F 1/145; G01L 5/221; B60C 23/02; B60W 2510/20; B60Y 2400/303; B60Y 2400/404
See application file for complete search history.

(56) References Cited

U.S. PATENT DOCUMENTS 4,798,253 A * 1/1989 Naito .................. B62D 6/10
180/404
5,517,096 A * 5/1996 Shtarkman ............... B62D 6/02
318/434
(Continued)

FOREIGN PATENT DOCUMENTS

KR 19980048866 U 10/1998
KR 10-2000-0073115 A 12/2000
(Continued)

*Primary Examiner* — Kevin Hurley
*Assistant Examiner* — Marlon A Arce
(74) *Attorney, Agent, or Firm* — Fox Rothschild LLP (57) ABSTRACT

A steering system of a vehicle is provided. The steering system adjusts the torsional rigidity of a torsion bar without limitation as to the configuration thereof and performs active control responding to the vehicle state by adjusting steering characteristics by controlling the torsional rigidity of the torsion bar based on the traveling condition, load state or driving mode of the vehicle. The steering system includes an MR assist device, which is coupled to an end portion of the torsion bar and adjusts the rotation and torsional rigidity of the torsion bar using an MR fluid as a working fluid.

19 Claims, 7 Drawing Sheets

(51) Int. Cl.
 *F16F 9/53* (2006.01)
 *B62D 55/108* (2006.01)
 *B62D 5/08* (2006.01)

(56) References Cited

U.S. PATENT DOCUMENTS

| | | | |
|---|---|---|---|
| 5,836,419 A * | 11/1998 | Shimizu | B62D 5/04 |
| | | | 180/443 |
| 6,279,952 B1 | 8/2001 | Van Wynsberghe et al. | |
| 2001/0054527 A1 | 12/2001 | Card | |
| 2015/0032334 A1 | 1/2015 | Jang | |

FOREIGN PATENT DOCUMENTS

| | | |
|---|---|---|
| KR | 10-2008-0113684 A | 12/2008 |
| KR | 10-2008-0113716 A | 12/2008 |
| KR | 2009-0076216 A | 7/2009 |

\* cited by examiner

FIG. 1

RELATED ART

STEERING SYSTEM OF VEHICLE

CROSS-REFERENCE TO RELATED APPLICATION

This application claims under 35 U.S.C. § 119(a) the benefit of priority to Korean Patent Application No. 10-2018-0156811 filed on Dec. 7, 2018, the entire contents of which are incorporated herein by reference.

BACKGROUND

(a) Technical Field

The present disclosure relates to a steering system of a vehicle, and more particularly, to a steering system of a vehicle capable of easily adjusting the torsional rigidity of a torsion bar without limitation as to the configuration thereof and adjusting steering characteristics by adjusting the torsional rigidity of the torsion bar based on the traveling condition, load state or driving mode of the vehicle.

(b) Background Art

In general, as a power steering system for reducing the steering force applied by the driver to steer a vehicle, there are known a hydraulic power steering (HPS) system, which assists the steering force applied by the driver using the oil pressure generated by a hydraulic pump, and a motor driven power steering (MDPS) system, which assists the steering force applied by the driver using the output torque of an electric motor. Particularly, when the MDPS system performs a steering assist function in response to the driver's steering wheel operation, the output torque (i.e. assist torque to be adjusted) of the electric motor for steering assist is adjusted in response to the traveling condition of the vehicle.

In the MDPS system, the steering force applied to the steering wheel is adjusted in response to the traveling speed of the vehicle. When the vehicle stops or travels at a low speed, the steering becomes light due to the rotational force of the motor, and when the vehicle travels at a high speed, the steering becomes heavy to secure high-speed traveling stability. On the other hand, in the HPS system, a power steering pump is driven by the engine power, and power steering oil supplied from the pump is injected into a cylinder, thereby generating force for assisting steering (steering assist force).

Figure 1:
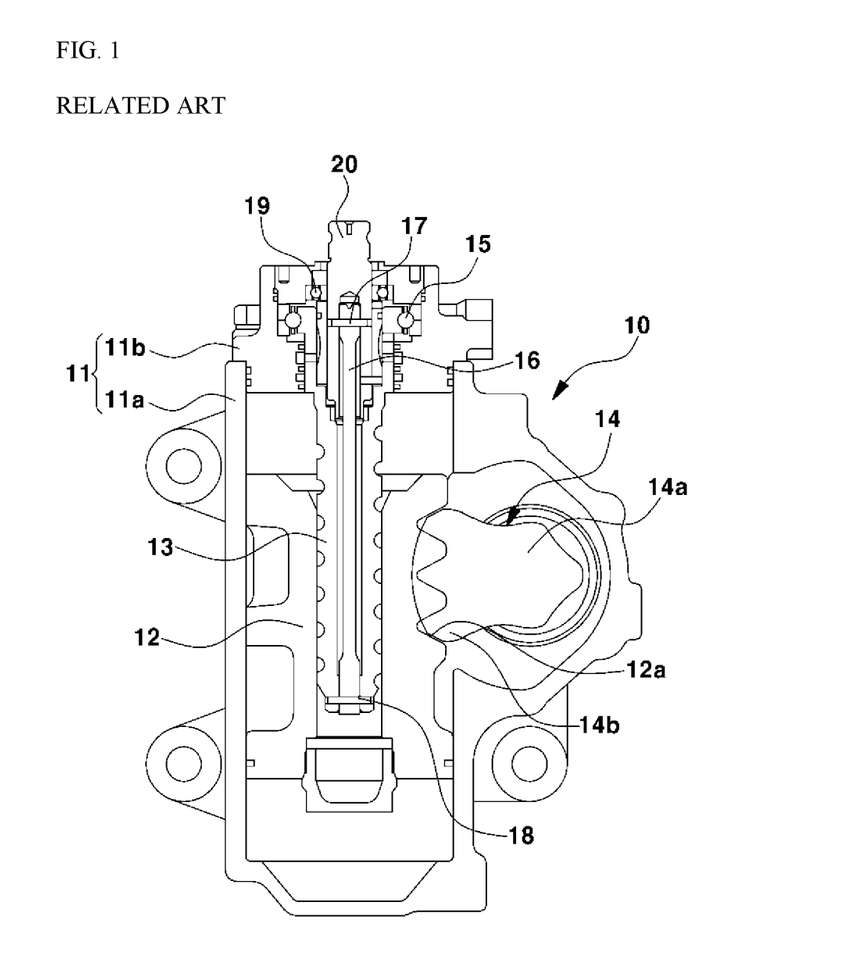
FIG. 1 is a longitudinal-sectional view illustrating the internal configuration of a steering gear box in a hydraulic power steering system in the related art.

FIG. 1 is a longitudinal-sectional view illustrating the internal configuration of a steering gear box in the HPS system according to the related art, which is applicable to commercial vehicles such as trucks. As shown in the drawing, a housing 11 includes a housing body 11a and a housing cap 11b. A cylinder 12 is installed in the housing 11 to be movable vertically in the drawing. A hollow worm shaft 13 is screw-coupled to the inner surface of the cylinder 12, and a sector shaft 14 is tooth-engaged with the outer surface of the cylinder 12.

The sector shaft 14 includes a sector gear portion 14a, which is rotatably provided in the housing 11, and a shaft portion (not shown), which is integrally coupled to the sector gear portion 14a. The sector gear portion 14a is configured as a sector gear, teeth 14b of which are engaged with a tooth recess 12a formed in the outer surface of the cylinder 12. The shaft portion of the sector shaft 14 extends in a direction that crosses the axial direction of the worm shaft 13, the torsion bar 16 and the cylinder 12.

The worm shaft 13, disposed in the cylinder 12, is supported at the upper end thereof by a bearing 15 to be rotatable in the housing 11. The torsion bar 16 is integrally coupled to the interior of the worm shaft 13 to transmit rotational force. The torsion bar 16 is interposed between the input shaft 20 and the worm shaft 13 to transmit rotational force. The upper end portion of the torsion bar 16 is inserted into the hollow region in the input shaft 20, and a fixing pin 17 is press-fitted through the upper end portion of the torsion bar 16 and the input shaft 20. Accordingly, the upper end portion of the torsion bar 16 and the input shaft 20 are coupled to each other to rotate together.

In addition, the lower end portion of the torsion bar 16 is inserted into the worm shaft 13, and a fixing pin 18 is press-fitted through the lower end portion of the torsion bar 16 and the worm shaft 13. Accordingly, the lower end portion of the torsion bar 16 and the lower end portion of the worm shaft 13 are coupled to each other to rotate together. The input shaft 20 is coupled to the interior of the housing 11 while being rotatably supported by a bearing 19, and is coupled to a steering column (not shown) to rotate together with the steering column.

When the steering column is rotated by the driver's steering wheel operation, the rotational force of the steering column is transmitted to the input shaft 20, and the torsion bar 16 is twisted by the rotational force transmitted to the input shaft 20. The rotational force of the input shaft 20 is transmitted to the worm shaft 13 via the torsion bar 16. The rotation of the worm shaft 13 causes the cylinder 12 to move forwards and backwards in the axial direction thereof, i.e. vertically in the drawing.

When the cylinder 12 moves forwards and backwards, the sector shaft 14, which is tooth-engaged with the cylinder 12 via the sector gear portion 14a, rotates. A valve assembly (not shown) is disposed around the input shaft 20 and the torsion bar 16 in the housing 11. The oil pressure is applied to the torsion bar 16 via the valve assembly.

Although not illustrated, the valve assembly may be mounted to the housing cap 11b of the housing 11, and may include a valve body having a port, and a hydraulic line connected to the port of the valve body. In the valve assembly, oil is supplied into the valve body or is discharged outside the valve body through the port. When the driver operates the steering wheel, steering assist force is generated by the pressure of the fluid (oil) that is selectively supplied to or discharged from the valve body.

In the configuration described above, the opening/closing timing of the valve is adjusted based on the torsional rigidity of the torsion bar, and accordingly steering force (and steering assist force) is determined. The torsional rigidity is determined based on the diameter and material of the torsion bar. In a steering system in the related art, a torsion bar is made of metal, and the torsional rigidity is adjusted by increasing or decreasing the diameter of the torsion bar. However, the steering system in the related art configured as described above faces various limitations in increasing or decreasing the diameter of the torsion bar while satisfying requirements for package assembly conditions and durability.

The above information disclosed in this section is merely for enhancement of understanding of the background of the invention, and therefore it may contain information that does not form the prior art that is already known in this country to a person of ordinary skill in the art.

SUMMARY

The present invention provides a steering system of a vehicle, which is capable of more easily adjusting the torsional rigidity of a torsion bar without limitation as to the configuration thereof and adjusting steering characteristics by controlling the torsional rigidity of the torsion bar based on the traveling condition, load state or driving mode of the vehicle.

In one aspect, the present invention provides a steering system of a vehicle, including a steering gear box configured to multiply steering force applied by the driver and to output the multiplied steering force by generating steering assist force using oil pressure, wherein the steering gear box may include an input shaft inserted into and coupled to a housing, the input shaft configured to receive the steering force applied by the driver, a worm shaft installed in the housing to be rotatably supported by the housing, a cylinder configured to allow the worm shaft to be inserted thereinto and screw-coupled therewith, the cylinder moving forwards and backwards in an axial direction within the housing when the worm shaft rotates, a torsion bar interposed between the input shaft and the worm shaft to transmit rotational force of the input shaft to the worm shaft, a valve assembly configured to selectively apply or remove oil pressure to or from the housing to generate steering assist force, a sector shaft coupled to the cylinder, the sector shaft configured to output steering force, to which the steering assist force is added, by being rotated by forward and backward movement of the cylinder, and a magneto-rheological (MR) assist device coupled to an end portion of the torsion bar, the MR assist device being configured to adjust the rotation and torsional rigidity of the torsion bar using an MR fluid as a working fluid.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings so that those skilled in the art may easily carry out the exemplary embodiments. The present invention may, however, be embodied in many different forms, and should not be construed as being limited to the exemplary embodiments set forth herein.

The present invention relates to a steering system of a vehicle, and more particularly to a hydraulic power steering (HPS) system that is applicable to commercial vehicles such as trucks. The steering system of a vehicle according to the present invention is capable of adjusting the steering characteristics and steering assist characteristics by variably controlling the rotation and torsional rigidity of a torsion bar based on the state of the vehicle using the damping force of a magneto-rheological fluid (hereinafter referred to as an "MR fluid").

Figure 2:
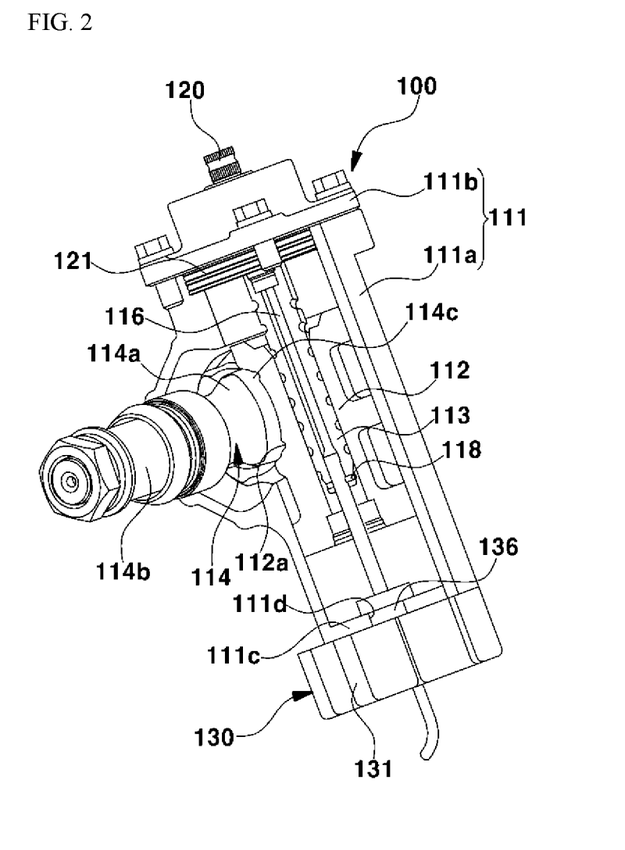
FIG. 2 is a cross-sectional perspective view showing the internal configuration of a steering gear box in a steering system of a vehicle according to an exemplary embodiment of the present invention.
Figure 3:
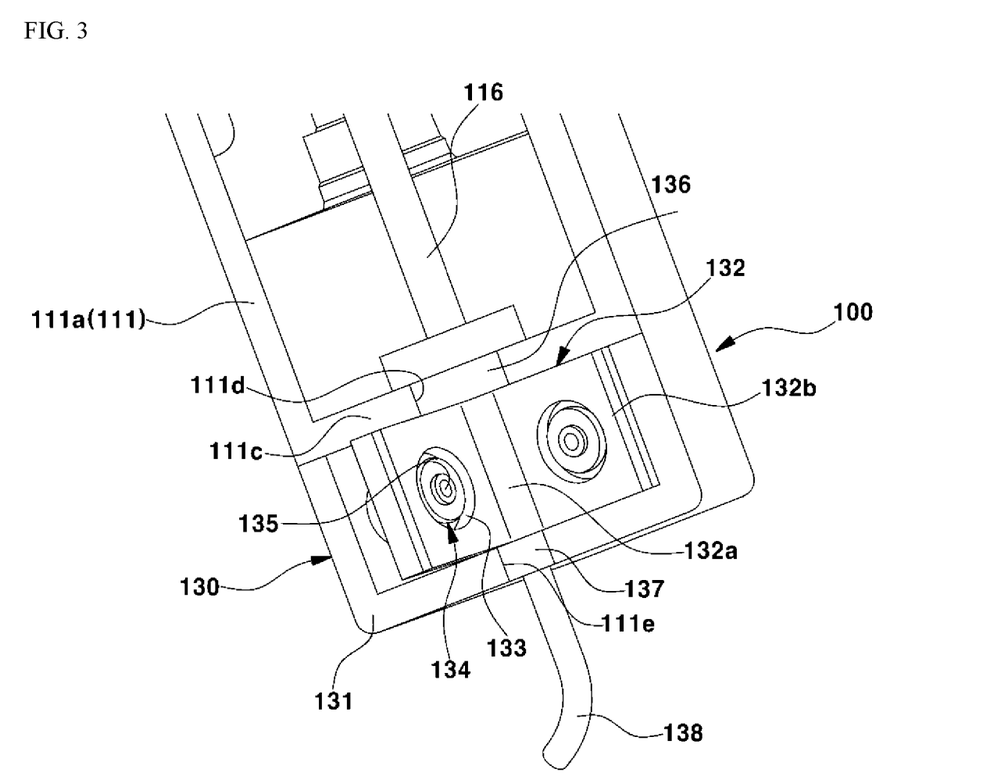
FIG. 3 is a cross-sectional perspective view showing an MR assist device of the steering gear box in the steering system of a vehicle according to the exemplary embodiment of the present invention.
Figure 4:
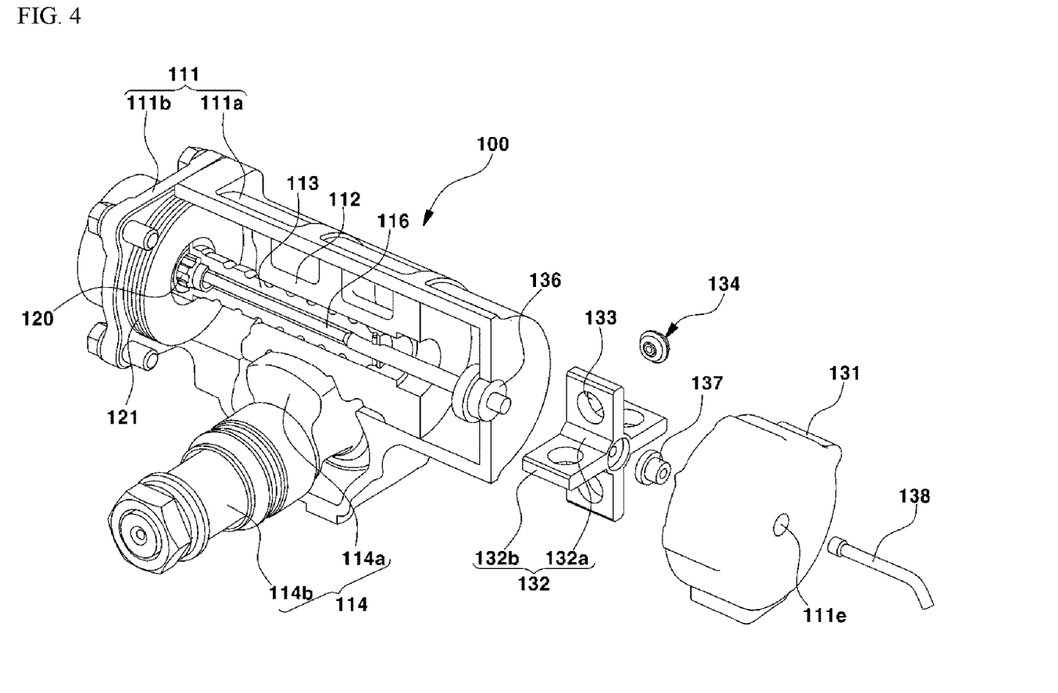
FIG. 4 is a cross-sectional perspective view showing the entire configuration of the steering gear box in the steering system of a vehicle according to the exemplary embodiment of the present invention.

FIG. 2 is a perspective view showing the cross-section of the internal configuration of a steering gear box in a steering system of a vehicle according to an exemplary embodiment of the present invention, and FIG. 3 is a perspective view showing the cross-section of an MR assist device of the steering gear box in the steering system of a vehicle according to the exemplary embodiment of the present invention. FIG. 4 is a perspective view showing the cross-section of the entire configuration of the steering gear box in the steering system of a vehicle according to the exemplary embodiment of the present invention in the state in which the constituent elements of the MR assist device are disassembled.

Figure 5:
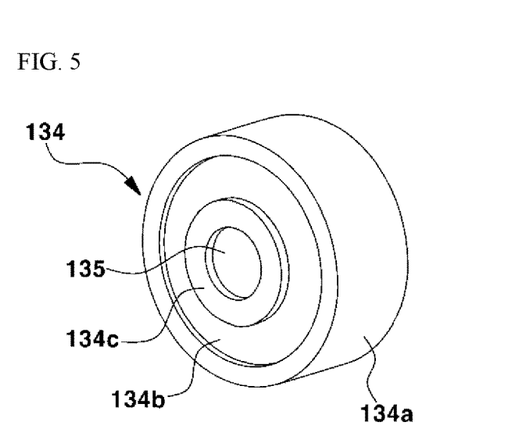
FIG. 5 is an enlarged perspective view showing an electromagnet assembly and an orifice of the steering gear box in the steering system of a vehicle according to the exemplary embodiment of the present invention.
Figure 6:
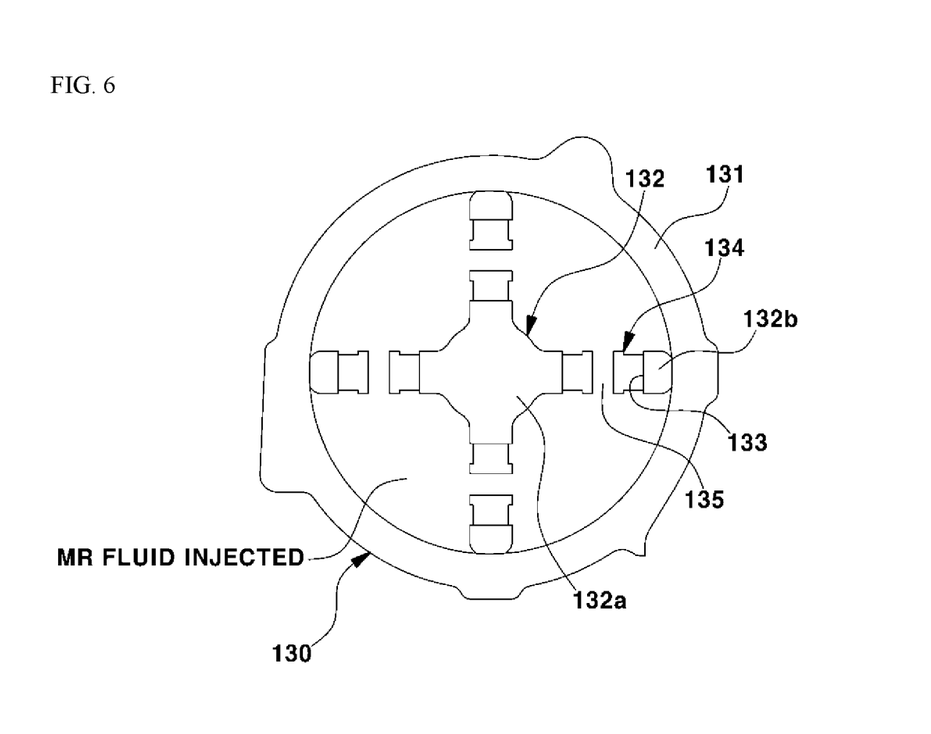
FIG. 6 is a cross-sectional view of the MR assist device in the steering system of a vehicle according to the exemplary embodiment of the present invention.
Figure 7:
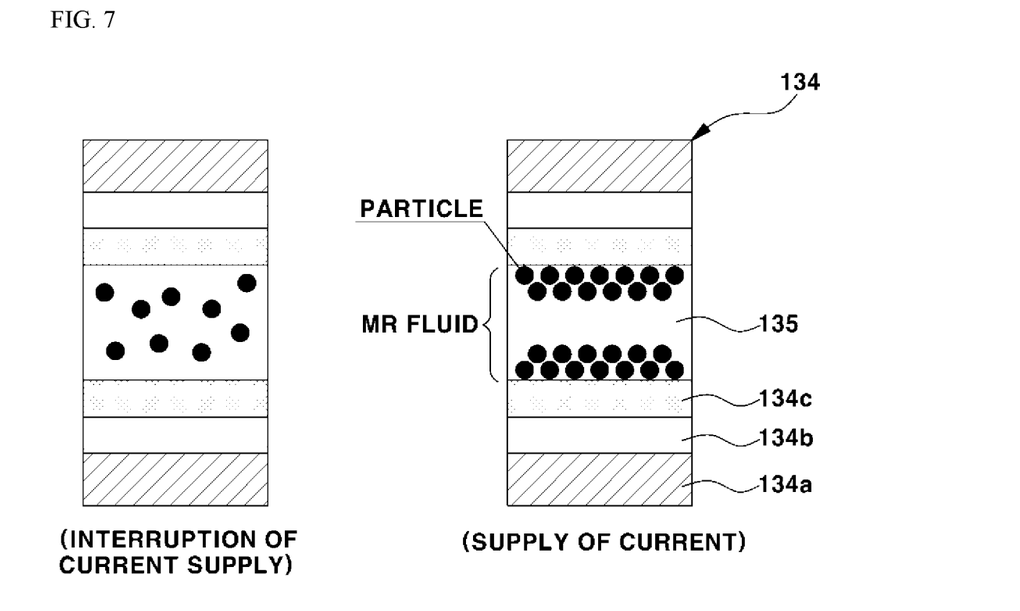
FIG. 7 is a view showing magnetic field ON/OFF of the MR assist device in the steering system of a vehicle according to the exemplary embodiment of the present invention.

FIG. 5 is an enlarged perspective view showing the assembly of an electromagnet assembly and an orifice of the steering gear box in the steering system of a vehicle according to the exemplary embodiment of the present invention, and FIG. 6 is a cross-sectional view of the MR assist device in the steering system of a vehicle according to the exemplary embodiment of the present invention. FIG. 7 is a view showing magnetic field ON/OFF of the MR assist device in the steering system of a vehicle according to the exemplary embodiment of the present invention.

The steering system according to the exemplary embodiment of the present invention may include a steering gear box 100 configured to generate and output multiplied steering force using oil pressure in response to driver operation of the steering wheel. The steering gear box 100 may include an assist device 130 (hereinafter referred to an "MR assist device") that uses an MR fluid as a working fluid. The MR assist device 130 may be coupled to the end portion of a torsion bar 116, and may be configured to adjust the rotation and torsional rigidity of the torsion bar. Except for the configuration in which the MR assist device 130 is coupled to the end portion of the torsion bar 116, the basic configuration of the gear box 100 in the steering system according to the exemplary embodiment of the present invention does not have a substantial difference from that in the related art.

Referring to FIG. 2, the gear box 100 of the steering system may include a housing 111. The housing 111 may include a housing body 111*a* having an internal space and a housing cap 111*b* assembled to one side of the housing body to seal the internal space in the housing body 111*a*. A cylinder 112 having a cylindrical shape may be installed in the internal space in the housing 111 to be movable vertically in the drawing. A hollow worm shaft 113 may be screw-coupled to the inner surface of the cylinder 112, and a sector shaft 114 may be tooth-engaged with the outer surface of the cylinder 112.

The outer circumferential surface of the worm shaft 113 and the inner circumferential surface of the cylinder 112 may be screw-coupled to each other. When the worm shaft 113 rotates, the cylinder 112 may move forwards and backwards in the axial direction thereof. The sector shaft 114 may include a sector gear portion 114*a*, rotatably provided in the internal space in the housing 111, and a shaft portion 114*b*, integrally coupled to the sector gear portion 114*a*. The sector gear portion 114*a* is configured as a sector gear, teeth 114*c* of which are engaged with a tooth recess 112*a* formed in the outer surface of the cylinder 112. The shaft portion 114*b* of the sector shaft 114 may be elongated such that the axial direction thereof crosses the axial direction of the components arranged coaxially in the housing 111, i.e. the worm shaft 113, the torsion bar 116 and the cylinder 112.

In the steering system for commercial vehicles in the related art, the output side of the steering gear box 100 is connected with a pitman arm. This pitman arm is connected to the sector shaft 114, which is a component of the output side of the steering gear box 100. This configuration is identically applied to the exemplary embodiment of the present invention. The pitman arm may be configured to receive force generated when the sector shaft 114 rotates. In other words, the pitman arm may be configured to receive steering force output via the sector shaft 114, i.e. multiplied steering force output from the steering gear box 100, and perform a circular arc motion. At this time, the pitman arm may be configured to transmit the torque output from the steering gear box 100 to a drag link.

The configuration described above with reference to FIG. 1, i.e. the configuration in which the worm shaft 113 is installed in the internal space in the housing 111 and the coupling relationship among the worm shaft 113, the torsion bar 116 and the input shaft 120, may be identically applied to the exemplary embodiment of the present invention. For example, the worm shaft 113, which is disposed in the cylinder 112, is supported at the upper end thereof by a bearing (not shown) to be rotatable in the housing 111. The torsion bar 116 is integrally coupled to the interior of the hollow region of the worm shaft 113 to transmit rotational force.

Further, the torsion bar 116 may be interposed between the input shaft 120 and the worm shaft 113 to transmit rotational force. The upper end portion of the torsion bar 116 may be inserted into the hollow region in the input shaft 120, and a fixing pin (not shown) may be press-fitted through the upper end portion of the torsion bar 116 and the input shaft 120. Accordingly, the upper end portion of the torsion bar 116 and the input shaft 120 may be coupled to each other to rotate together.

In the exemplary embodiment of the present invention, the intermediate portion of the torsion bar 116 may be inserted into the worm shaft 113, and a fixing pin (not shown) may be press-fitted through the intermediate portion of the torsion bar 116 and the worm shaft 113. Accordingly, the intermediate portion of the torsion bar 116 and the lower end portion of the worm shaft 113 may be coupled to each other to rotate together. According to the present invention, the lower end portion of the torsion bar 116 may be coupled to the MR assist device 130, which will be described later in detail.

The input shaft 120 may be inserted into and coupled to the interior of the housing 111 while being rotatably supported by a bearing (not shown), and may be coupled to a steering column (not shown) to rotate together with the steering column. When the steering column is rotated by the driver's steering wheel operation (e.g., a steering wheel operation input), the rotational force of the steering column may be transmitted to the input shaft 120, and the torsion bar 116 may be twisted by the rotational force transmitted to the input shaft 120.

The rotational force of the input shaft 120 may be transmitted to the worm shaft 113 via the torsion bar 116. The rotation of the worm shaft 113 causes the cylinder 112 to move forwards and backwards in the axial direction thereof, i.e. vertically in the drawing. When the cylinder 112 moves forwards and backwards, the sector shaft 114, which is tooth-engaged with the cylinder 112 via the sector gear portion 114a thereof, rotates. Accordingly, in the steering gear box 100, the part to which the driver's steering force is input is the input shaft 120, and the part through which the multiplied steering force is output is the sector shaft 114.

A valve assembly 121 may be disposed around the input shaft 120 and the torsion bar 116 in the housing 111. The oil pressure may be applied to the torsion bar 116 via the valve assembly 121. In particular, the valve assembly 121 may be mounted to the housing cap 111b of the housing 111. Although not illustrated, the valve assembly 121 may include a valve body having a port, and a hydraulic line connected to the port of the valve body. In the valve assembly 121, oil may be supplied into the valve body or may be discharged outside the valve body through the port (not shown). When the driver operates the steering wheel, steering assist force may be generated by the pressure of the fluid (oil) that is selectively supplied to or discharged from the valve body.

In the gear box 100, when the pressure of the fluid supplied via the valve assembly is applied to the torsion bar 116, the steering assist force generated by the pressure of the fluid applied to the torsion bar 116 is added to the driver's steering force transmitted via the input shaft 120. The sum of the generated steering assist force and the driver's steering force may be output through the sector shaft 114. Additionally, according to the present invention, the MR assist device 130 may be disposed at the lower end portion of the gear box 100. As described above, the MR assist device 130 may be coupled to the lower end portion of the torsion bar 116.

The MR assist device 130 may include an MR fluid chamber 131 provided to define a sealed internal space in the lower end portion of the housing 111. The MR fluid chamber 131 may be integrally formed with the lower end portion of the housing 111. The lower end portion of the torsion bar 116 penetrates a partition wall 111c, disposed between the housing 111 located at the upper side and the MR fluid chamber 131 located at the lower side.

The partition wall 111c may separate the internal space in the housing 111 and the internal space in the MR fluid chamber 131 from each other and seal the internal space in the MR fluid chamber 131. A fluid seal 136 for preventing leakage of the gear oil and the MR fluid may be interposed between an aperture 111d formed in the partition wall 111c and the lower end portion of the torsion bar 116 penetrating the aperture 111d. The internal space in the MR fluid chamber 131 may be filled with the MR fluid and may be sealed. A blade 132 and an electromagnet assembly 134 may be disposed in the internal space in the MR fluid chamber 131 filled with the MR fluid.

The blade 132 may include a hub 132a disposed at the center thereof and a plurality of wings 132b integrally formed with the hub 132a. The hub 132a may be coupled to the lower end portion of the torsion bar 116 to rotate therewith in the MR fluid chamber 131. Since the blade 132 may be integrally coupled to the lower end portion of the torsion bar 116 via the hub 132a, when the torsion bar 116 rotates, the blade 132 also rotates about the torsion bar 116 and the hub 132a. At this time, the entire blade 132 including the wings 132b may rotate at the same angle as the torsion bar 116.

The electromagnet assembly 134 may be installed at least one of the wings 132b of the blade 132. The electromagnet assembly 134 may include an orifice 135 having a hollow structure so that the MR fluid passes through the corresponding wing 132b of the blade 132. In an exemplary embodiment, a plurality of electromagnet assemblies 134 may be installed are some of the wings 132b of the blade 132. Alternatively, as shown in the drawings, a plurality of electromagnet assemblies 134 may be installed at all of the wings 132b. At this time, each of the electromagnet assemblies 134, which is provided with the orifice 135, may be installed at a respective one of the wings 132b. The installation positions of the electromagnet assemblies 134 in the wings 132b may be the same.

In the exemplary embodiment of the present invention, the orifice 135 may be formed such that an orifice tube 134c is mounted to the electromagnet assembly 134, installed at each wing 132b of the blade 132, to penetrate the corresponding wing 132b. The internal space in the orifice 134c becomes the orifice 135 through which the MR fluid may pass. Accordingly, as shown in FIG. 4, each of the wings 132b of the blade 132 may include an installation aperture 133 formed therethrough to allow the electromagnet assembly 134 to be mounted to the corresponding wing. The electromagnet assembly 134 may be inserted into (fitted into) the corresponding installation aperture 133. The electromagnet assembly 134 may include an outer shell 134a, which has a ring or cylindrical shape and is inserted into the installation aperture 133, a coil unit 134b, which has a ring shape and is fixed to the inner surface of the outer shell 134a, and an orifice tube 134c, which is fixed to the inner surface of the coil unit 134b.

Although the housing 111 of the gear box 100 and the MR fluid chamber 131 are illustrated in FIG. 3 as being provided separately, the housing 111 and the MR fluid chamber 131 may be formed in an integrated structure while being partitioned by the partition wall 111c, and the hub 132a, which is the center portion of the blade 132, may be rotatably supported by the lower surface of the MR fluid chamber 131 via an MR fluid seal 137. A cable 138 for applying current to the coil unit 134b of the electromagnet assembly 134 may be inserted into the MR fluid chamber 131 by penetrating the lower surface of the MR fluid chamber 131, and may be connected to the coil unit 134b of the electromagnet assembly 134 via the blade 132. The MR fluid seal 137 may be interposed between the cable 138 and a lower-surface aperture 111e formed in the MR fluid chamber 131 through which the cable 138 passes.

In other words, the MR fluid seal 137 may be press-fitted into the lower surface aperture 111e in the MR fluid chamber 131, and the cable 138 may be press-fitted into the hollow region in the MR fluid seal 137. Thus, no gap is formed between the lower surface aperture 111e in the MR fluid chamber 131 and the cable 138 by the MR fluid seal 137, and the internal space in the MR fluid chamber 131 may be sealed. The sealed internal space in the MR fluid chamber 131 may be filled with the MR fluid. The cable 138 may be electrically connected to the coil unit 134b of the electromagnet assembly 134 via an internal leading wire provided in the hub 132a and the wings 132b of the blade 132. When current is applied to the coil unit 134b through the cable 138, a magnetic field is generated in the orifice tube 134c.

Referring to FIG. 6, four wings 132b may be arranged at uniform intervals around the hub 132a of the blade 132 in four directions, and the electromagnet assembly 134 having the orifice 135 may be installed in the installation aperture 133 formed in each wing 132*b*. Each wing 132*b* has a structure in which an aperture, i.e. the orifice 135, may be formed by the orifice tube 134*c* of the electromagnet assembly 134. When the blade 132 rotates due to the rotation of the torsion bar 116, the MR fluid may pass through the orifice 135 in each wing 132*b*.

FIG. 7 illustrates the electromagnet assembly 134, which includes the outer shell 134*a*, the coil unit 134*b* disposed inside the outer shell 134*a*, and the orifice tube 134*c* disposed inside the coil unit 134*b*. The internal space in the orifice tube 134*c* becomes the orifice 135. As illustrated in the drawing, when the MR fluid is present in the orifice 135 and current is applied to the coil unit 134*b* of the electromagnet assembly 134 through the cable 138, a magnetic field is generated in the orifice 135.

When a magnetic field is applied to the MR fluid, the particles in the MR fluid, which were scattered irregularly, may be arranged regularly, and accordingly the viscosity of the MR fluid, which is in a liquid state, increases. The greater the intensity of current applied to the coil unit 134*b*, the more the viscosity of the MR fluid increases. In other words, the viscosity of the MR fluid may be adjusted based on the intensity of current that is applied to the electromagnet assembly 134 through the cable 138. For example, when current is applied to the coil unit 134*b*, the torsion bar 116 rotates less smoothly than when current is not applied.

Furthermore, the viscosity of the MR fluid further increases when a substantial amount of current is applied to the coil unit 134*b* of the electromagnet assembly 134 compared to when a minimal amount of current is applied. Thus, when a substantial amount of current is applied, greater force is required to rotate the blade 132 to a particular degree compared to when a minimal amount of current is applied. In other words, the greater the intensity of current applied to the coil unit 134*b* of the electromagnet assembly 134, the larger the force required to rotate the torsion bar 116 and the blade 132. In addition, the greater the intensity of current, the less smooth the rotation of the torsion bar 116. As a result, the driver is required to apply larger steering force to turn the steering wheel.

As described above, the steering force required for the driver to turn the steering wheel may be adjusted by changing the intensity of the current applied to the electromagnet assembly 134. Accordingly, it may be possible to adjust the steering characteristics of the steering system. The intensity of the current applied to the electromagnet assembly 134 may be adjusted by a controller. When the controller increases the intensity of the current, the steering wheel and the steering sensation thereof may become heavy (e.g., the rotation of the steering wheel may become more resistive). On the other hand, when the controller decreases the intensity of the current, the steering wheel and the steering sensation thereof may become light.

Figure 8:
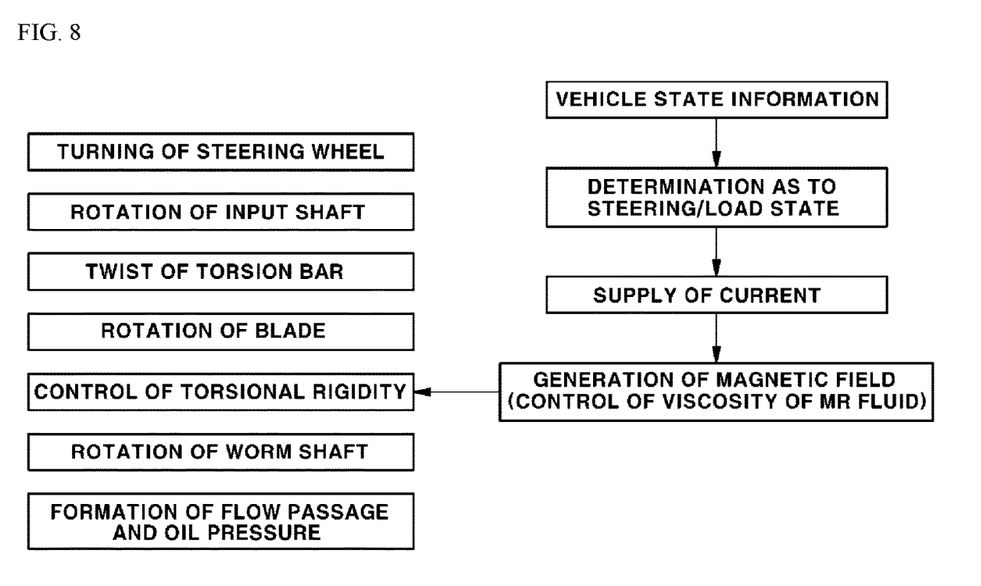
FIG. 8 is a flowchart showing the process in which steering force is generated by oil pressure in response to the driver's steering wheel operation in the steering system according to the exemplary embodiment of the present invention.
Figure 9:
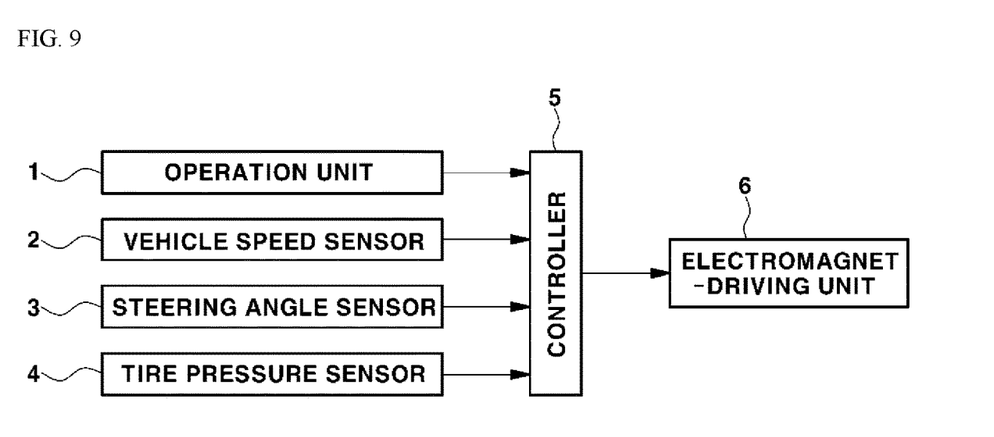
FIG. 9 is a block diagram showing the configuration of a system for controlling the MR assist device in the steering system according to the exemplary embodiment of the present invention.

Hereinafter, the operation process of the steering system configured as described above will be described in detail with reference to the accompanying drawings. FIG. 8 is a flowchart showing the process in which steering force is generated by oil pressure in response to the driver's steering wheel operation in the steering system of the present invention, and FIG. 9 is a block diagram showing the configuration of a system for controlling the MR assist device.

As shown in FIG. 8, when the driver rotates the steering wheel, the steering column is rotated, and the input shaft 120 is also rotated. The torsion bar 116 receives the rotational force of the input shaft 120 and may be twisted. When the torsion bar 116 is rotated, the blade 132 is also rotated together therewith. At the same time, the worm shaft 113 receives the rotational force via the torsion bar 116 and is rotated. Based on the rotational direction of the components including the steering wheel, the cylinder 112 moves forwards or backwards in the axial direction thereof.

A flow passage may be formed based on the opening/closing state of the valve body of the valve assembly 121, and the oil pressure may be applied to the steering gear box 100. The cylinder 112 may be moved by the oil pressure, and the sector shaft 114 may be rotated simultaneously therewith. As a result, the gear box 100 multiplies the driver's steering force (e.g., force of turning the steering wheel) and may be configured to output the multiplied steering force.

Moreover, the system for controlling the steering system according to the present invention may include a controller 5. The controller 5 may be configured to variably adjust the intensity of current that is applied to the electromagnet assembly 134 of the MR assist device 130 based on the current vehicle state information. Accordingly, the controller 5 may be configured to determine the traveling condition of the vehicle from the current vehicle state information, determine the current value that corresponds to the traveling condition, and apply the determined current value to the coil of the electromagnet assembly 134. The controller 5 may then be configured to output a control signal for applying current that corresponds to the traveling condition of the vehicle. In response to the control signal output from the controller 5, an electromagnet-driving unit 6 may be configured to operate to apply target current to the coil unit 134*b* of the electromagnet assembly 134.

The torsional rigidity of the torsion bar 116 may be adjusted by applying the current, which was adjusted based on the traveling condition of the vehicle, to the coil unit 134*b* of the MR assist device 130. In this manner, the steering characteristics of the steering system may be appropriately adjusted based on the traveling condition of the vehicle. The traveling condition of the vehicle may include high-speed travel, in which the vehicle speed detected by a vehicle speed sensor 2 is equal to or greater than a predetermined speed, and low-speed travel, in which the detected vehicle speed is less than the predetermined speed.

Alternatively, the traveling condition of the vehicle may include turning travel (e.g., a turn of the vehicle while being driven), in which the steering angle detected by a steering angle sensor 3 is equal to or greater than a predetermined angle, and substantially straight or linear travel, in which the detected steering angle is less than the predetermined angle. Alternatively, the traveling condition of the vehicle may include the above-mentioned high-speed travel, low-speed travel, turning travel and straight travel. Alternatively, the traveling condition of the vehicle may include low-speed turning travel, low-speed straight travel, high-speed turning travel and high-speed straight travel to perform complex control using both the vehicle speed and the steering angle.

Alternatively, the current that is applied to the electromagnet assembly 134 may be adjusted based on the load state of the vehicle, rather than the traveling condition of the vehicle. Alternatively, complex control may be performed to adjust the current based on the result of determining both the traveling condition and the load state of the vehicle. In other words, the controller 5 may be configured to determine the traveling condition of the vehicle, i.e. low-speed turning travel, low-speed straight travel, high-speed turning travel or high-speed straight travel, and more precisely adjust the current to be applied based on the determined traveling condition of the vehicle and the load state of the vehicle.

Accordingly, the vehicle state information obtained by the controller 5 may include at least one of the vehicle speed, the steering angle or the air pressure of the tires, which may be detected by well-known sensors 2, 3 and 4 installed within the vehicle. For example, the vehicle speed may be detected by the vehicle speed sensor 2, the steering angle may be detected by the steering angle sensor 3, and the air pressure of the tires may be detected by the tire pressure monitoring system (TPMS) sensor 4. The air pressure of the tires is a signal for determining the load state (weight of freight) of the vehicle.

Alternatively, current may be adjusted based on the driving mode selected by the driver. Accordingly, the controller 5 may be configured to receive a signal of an operation unit 1, such as a button or a switch, operated by the driver to select a driving mode. The controller 5 may be configured to detect the driving mode selected by the driver from the signal of the operation unit 1, and adjust the intensity of the current that is applied to the electromagnet assembly 134 based on the selected driving mode.

The control of the MR assist device 130 will now be described with reference to FIGS. 10 and 11. As described above, as the intensity of current that is applied to the MR assist device 130, i.e. the intensity of current that is applied to the coil unit 134b of the electromagnet assembly 134, is increased, the driver is required to apply larger force (steering force) to turn the steering wheel. In other words, even when turning the steering wheel to the same degree, the driver is required to apply a larger force to turn the steering wheel with the increase in the intensity of current to be applied. As the intensity of current is increased, the steering effort is increased (e.g., the steering becomes heavy or resistance of the wheel increases). At this time, the controller 5 may be configured to determine the driving mode selected by the driver from the signal of the operation unit 1 and adjust the intensity of the current that is applied to the electromagnet assembly 134 based on the selected driving mode.

Figure 10:
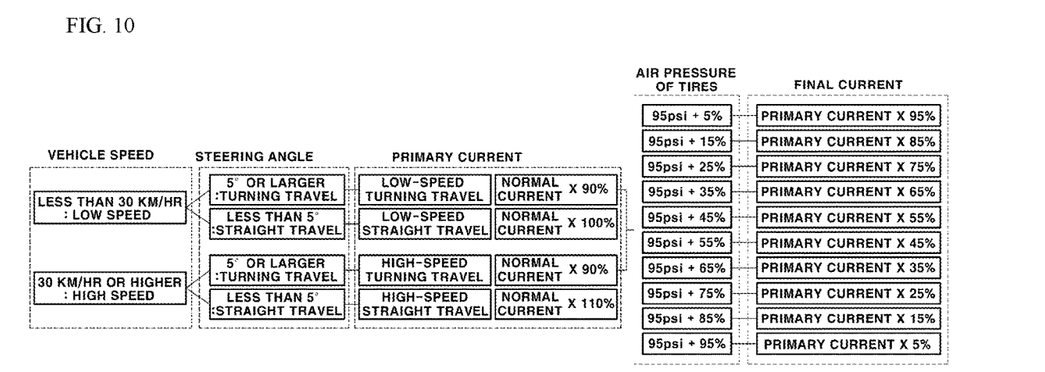
FIGS. 10 and 11 are views illustrating the control of the MR assist device in the steering system according to the exemplary embodiment of the present invention.
Figure 11:
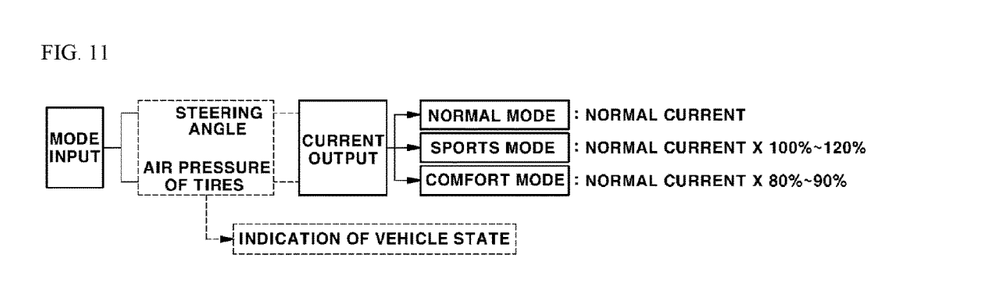

FIG. 10 shows an example of complex control according to an exemplary embodiment of the present invention. The current traveling condition of the vehicle may be determined as one of low-speed turning travel, low-speed straight travel, high-speed turning travel and high-speed straight travel based on the vehicle speed and the steering angle, and current that corresponds to the determined traveling condition may be applied.

Alternatively, the current value may be determined based on the load state of the vehicle in addition to the traveling condition of the vehicle. According to this complex control, as illustrated in FIG. 10, a final current value may be calculated by multiplying the primary current value determined based on the traveling condition (i.e. low-speed turning travel, low-speed straight travel, high-speed turning travel or high-speed straight travel) by a correction coefficient determined based on the air pressure of the tires.

Although the reference vehicle speed for distinguishing the high speed and the low speed is set to 30 km/hr in the example illustrated in FIG. 10, this is merely illustrative, and the present invention is not limited thereto. In addition, although the reference angle for distinguishing the straight travel and the turning travel is set to 5° in the example illustrated in FIG. 10, this is merely illustrative, and the present invention is not limited thereto.

The process of determining, by the controller 5, the primary current value based on the traveling condition of the vehicle is as follows. As illustrated in FIG. 10, the primary current value may be calculated by multiplying the normal current by a primary correction coefficient determined based on the traveling condition. In the example illustrated in FIG. 10, the primary correction coefficient for calculating the primary current value is set as follows: 90% (=0.9) in low-speed turning travel, 100% (=1) in low-speed straight travel, 90% (=0.9) in high-speed turning travel, and 110% (=1.1) in high-speed straight travel.

Subsequently, as illustrated in FIG. 10, the controller 5 may be configured to calculate the final current value by multiplying the primary current value by a secondary correction coefficient determined based on the air pressure of the tires. In particular, as the primary correction coefficient is set to a larger value, the primary current value may be calculated to be a larger value. Similarly, as the secondary correction coefficient is set to a larger value, the final current value may be calculated to be a larger value. The primary correction coefficient may be set to a larger value for low-speed straight travel than for low-speed turning travel. The primary correction coefficient may be set to a larger value for high-speed straight travel than for high-speed turning travel.

In the example illustrated in FIG. 10, the primary correction coefficient in the low-speed straight travel may be set to 100% (=1) indicating that the initially set steering force may be maintained (100% of the normal current is applied) in low-speed straight travel. In addition, the primary correction coefficient may be set to a larger value in the low-speed straight travel than in the high-speed turning travel. The primary correction coefficient may be set to a larger value in the high-speed straight travel than in the low-speed straight travel. The primary correction coefficient may be set to a larger value in the high-speed straight travel than in the low-speed turning travel.

In addition, it is desirable that the steering be made heavy in the low-speed turning travel and the high-speed turning travel. The primary correction coefficient in the low-speed turning travel and the primary correction coefficient in the high-speed turning travel may be set to the same value. Accordingly, in the high-speed straight travel of the vehicle, a larger amount of current may be applied to increase the steering effort, thereby enhancing the stability of straight travel.

On the other hand, compared to the high-speed straight travel, the steering effort may be decreased in low-speed turning travel, thereby reducing driver fatigue. In addition, higher air pressure of the tires indicates that a heavier load is applied to the vehicle. As the air pressure of the tires increases, the secondary correction coefficient may be set to a smaller value.

In the example illustrated in FIG. 10, the minimum reference pressure of the tires is 95 psi. However, this minimum reference value is merely illustrative, and the present invention is not limited thereto. The minimum reference value may be set to any one of various other values. As illustrated in FIG. 10, the controller 5 may be configured to compare the air pressure of the tires detected by the sensor 4 with threshold values, which are set for respective air-pressure stages, and determine an air-pressure stage that corresponds to the current air pressure of the tires.

Referring to FIG. 10, the air-pressure stages may be divided into 10 stages, and the threshold values for determining the air-pressure stage from the currently detected air pressure of the tires are set in the following manner: Threshold Value=Minimum Reference Pressure+Minimum Reference Pressure×Threshold Ratio.

To cause the threshold value to be different based on the threshold ratio, particularly, to cause the threshold value to increase with a given interval from a lower stage to a higher stage, the threshold ratio may be set to increase with a constant interval from a lower stage to a higher stage. In the example in FIG. 10, the threshold ratio is set to start from 5% and increase by 10% for each stage. The smallest threshold value is set to 99.75 psi (=95 psi+95 psi×5%), and the threshold value increases from 99.75 psi by 9.5 psi (=95 psi×10%) for each stage.

Through the comparison between the current air pressure of the tires detected by the sensor 4 and the threshold values, the secondary correction value for the corresponding air-pressure stage may be calculated. The controller may be set such that the secondary correction coefficient is decreased as the current air pressure of the tires increases. Therefore, as the current air pressure of the tires increases, the final current value, calculated by multiplying the primary current value by the secondary correction coefficient, may be determined to be a smaller value. In the example in FIG. 10, the secondary correction coefficient gradually decreases, i.e. 95% (=0.95), 85% (=0.85), . . . , 15% (=0.15), and 5% (=0.05), from a higher tire-air-pressure stage to a lower tire-air-pressure stage.

As described above, the complex control is control for automatically adjusting the current to be applied based on the traveling condition and load state of the vehicle and for changing the steering force at all times. Furthermore, the complex control is active control responding to the vehicle state, which changes the steering force in real time by detecting the vehicle state and outputting current suitable for the detected vehicle state. On the other hand, as illustrated in FIG. 11, the steering system may be configured such that the driver is capable of selecting manual control through the operation unit 1. When the driver selects and inputs a desired driving mode, the controller 5 may be configured to execute control such that the steering force corresponding to the driving mode selected by the driver is maintained constant.

The manual control is control for maintaining the steering force constant and suitable for the driver's tastes. The driving mode, which is selected by the driver through the operation unit 1, may include a normal mode, a sports mode and a comfort mode. In particular, the normal mode is a mode that generates standard steering force, which is typically set in complete vehicles. The steering force in the normal mode may be the initially set steering force. In order to adjust the steering force in the sports mode to be greater than that in the normal mode, the intensity of the current that is applied to the electromagnet assembly 134 of the MR assist device 130 in the sports mode may be set in the controller 5 as a larger value than that in the normal mode.

To adjust the steering force in the comfort mode to be less than that in the normal mode, the intensity of the current that is applied to the electromagnet assembly 134 of the MR assist device 130 in the comfort mode may be set in the controller 5 as a smaller value than that in the normal mode. In addition, in manual control, vehicle state information, including the steering angle and the air pressure of the tires detected by the sensors, may be collected and provided to the driver via vehicle state indicators, thereby recommending a mode change to the driver. As a result, the steering system of a vehicle according to the exemplary embodiment of the present invention is capable of, based on the traveling state of the vehicle, variably adjusting the steering characteristics and steering assist characteristics that the driver feels, thereby improving the marketability of the vehicle.

As is apparent from the above description, according to the steering system of a vehicle of the present invention, it may be possible to more easily adjust the torsional rigidity of a torsion bar without limitation as to the configuration thereof and to adjust steering characteristics by controlling the torsional rigidity of the torsion bar based on the traveling condition, load state or driving mode of the vehicle. The invention has been described in detail with reference to embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A steering system of a vehicle, comprising:
a steering gear box configured to multiply steering force applied by a driver and to output the multiplied steering force by generating steering assist force using oil pressure,
wherein the steering gear box comprises:
an input shaft inserted into and coupled to a housing, the input shaft being configured to receive the steering force applied by the driver;
a worm shaft installed in the housing, the worm shaft being rotatably supported by the housing;
a cylinder into which the worm shaft is inserted and to which the worm shaft is screw-coupled, the cylinder moving forwards and backwards in an axial direction within the housing when the worm shaft rotates;
a torsion bar interposed between the input shaft and the worm shaft to transmit rotational force of the input shaft to the worm shaft;
a valve assembly configured to selectively apply or remove oil pressure to or from the housing to generate steering assist force;
a sector shaft coupled to the cylinder, the sector shaft being configured to output steering force, to which the steering assist force is added, by being rotated by forward and backward movement of the cylinder; and
a magneto-rheological (MR) assist device coupled to an end portion of the torsion bar, the MR assist device being configured to adjust rotation and torsional rigidity of the torsion bar using an MR fluid as a working fluid.

2. The steering system of claim 1, wherein the MR assist device includes:
an MR fluid chamber installed to an end portion of the housing, wherein the end portion of the torsion bar is inserted into the MR fluid chamber and wherein the MR fluid chamber is filled with the MR fluid and sealed;
a blade coupled to the end portion of the torsion bar, the blade being rotatable together with the torsion bar and including a plurality of wings;
at least one electromagnet assembly mounted to at least one of the wings, the electromagnet assembly including an orifice to allow the MR fluid to pass therethrough; and
a controller configured to adjust current to be applied to the electromagnet assembly.

3. The steering system of claim 2, wherein the at least one electromagnet assembly includes a plurality of electromagnet assemblies, each of the electromagnet assemblies being mounted to a respective one of the wings of the blade and including the orifice, and wherein installation positions of the electromagnet assemblies in the wings are same.

4. The steering system of claim 2, wherein the electromagnet assembly includes:

an outer shell inserted into an installation aperture formed in a corresponding one of the wings, the outer shell having a ring shape;

a coil unit inserted into the outer shell, the coil unit having a ring shape; and an orifice tube fixed to an inner surface of the coil unit, wherein an internal space in the orifice tube is formed as an orifice through which the MR fluid passes.

5. The steering system of claim 2, wherein a cable for applying current to the electromagnet assembly passes through a lower-surface aperture formed in the MR fluid chamber and is connected to the electromagnet assembly via the blade within the MR fluid chamber, and wherein an MR fluid seal is interposed between the cable and the lower-surface aperture formed in the MR fluid chamber.

6. The steering system of claim 2, wherein the controller is configured to determine a traveling condition of a vehicle from current vehicle state information collected from the vehicle and apply a current value that corresponds to the determined traveling condition of the vehicle to the electromagnet assembly.

7. The steering system of claim 6, wherein the vehicle state information includes a current vehicle speed detected by a vehicle speed sensor, and wherein the controller is configured to determine that the traveling condition of the vehicle is one of high-speed travel, in which the current vehicle speed is equal to or greater than a predetermined speed, and low-speed travel, in which the current vehicle speed is less than the predetermined speed, and is configured to apply a current value that corresponds to the determined traveling condition of the vehicle to the electromagnet assembly.

8. The steering system of claim 6, wherein the vehicle state information includes a steering angle detected by a steering angle sensor, and wherein the controller is configured to determine that the traveling condition of the vehicle is one of turning travel, in which the steering angle is equal to or greater than a predetermined angle, and straight travel, in which the steering angle is less than the predetermined angle, and is configured to adjust a current value that corresponds to the determined traveling condition of the vehicle to the electromagnet assembly.

9. The steering system of claim 6, wherein the vehicle state information includes a current vehicle speed detected by a vehicle speed sensor and a steering angle detected by a steering angle sensor.

10. The steering system of claim 9, wherein the vehicle state information further includes an air pressure of tires detected by a tire pressure sensor.

11. The steering system of claim 9, wherein the controller is configured to determine that the traveling condition of the vehicle is one of low-speed turning travel, in which the current vehicle speed is less than a predetermined speed and the steering angle is equal to or greater than a predetermined angle, low-speed straight travel, in which the current vehicle speed is less than the predetermined speed and the steering angle is less than the predetermined angle, high-speed turning travel, in which the current vehicle speed is equal to or greater than the predetermined speed and the steering angle is equal to or greater than the predetermined angle, and high-speed straight travel, in which the current vehicle speed is equal to or greater than the predetermined speed and the steering angle is less than the predetermined angle, and configured to adjust a current value that corresponds to the determined traveling condition of the vehicle to the electromagnet assembly.

12. The steering system of claim 11, wherein the controller is configured to determine a current value that corresponds to the determined traveling condition of the vehicle by multiplying a predetermined normal current by a correction coefficient corresponding to a determined one of the low-speed turning travel, the low-speed straight travel, the high-speed turning travel and the high-speed straight travel.

13. The steering system of claim 12, wherein the correction coefficient is set to be a larger value in the low-speed straight travel than in the low-speed turning travel and is set to be a larger value in the high-speed straight travel than in the high-speed turning travel.

14. The steering system of claim 12, wherein the correction coefficient is set to be a larger value in the low-speed straight travel than in the high-speed turning travel, is set to be a larger value in the high-speed straight travel than in the low-speed straight travel, and is set to be a larger value in the high-speed straight travel than in the low-speed turning travel.

15. The steering system of claim 11, wherein the vehicle state information further includes an air pressure of tires detected by a tire pressure sensor, and wherein the controller is configured to adjust a current value, calculated by multiplying the current value corresponding to the determined one of the low-speed turning travel, the low-speed straight travel, the high-speed turning travel and the high-speed straight travel by a correction coefficient determined in response to the air pressure of the tires, to the electromagnet assembly.

16. The steering system of claim 15, wherein the correction coefficient is set to be a smaller value as the air pressure of the tires increases.

17. The steering system of claim 2, further comprising:
an operation unit configured to receive a driver selection of a driving mode,
wherein the controller is configured to determine to driver selection of the driving mode and apply current to the electromagnet assembly in response to the determined driving mode.

18. The steering system of claim 17, wherein the driving mode includes a normal mode, a sports mode and a comfort mode, and wherein a current value to be applied to the electromagnet assembly in the sports mode is set in the controller as a larger value than in the normal mode.

19. The steering system of claim 18, wherein a current value to be applied to the electromagnet assembly in the comfort mode is set in the controller as a smaller value than in the normal mode.

* * * * *